United States Patent
Ruckstuhl (10) Patent No.: US 7,599,352 B2
(45) Date of Patent: Oct. 6, 2009

(54) METHOD FOR PROVIDING PSTN/ISDN SERVICES IN NEXT GENERATION NETWORKS

(75) Inventor: Hanspeter Ruckstuhl, Wolfratshausen (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 786 days.

(21) Appl. No.: 10/499,741

(22) PCT Filed: Dec. 17, 2002

(86) PCT No.: PCT/DE02/04619

§ 371 (c)(1),
(2), (4) Date: Jun. 17, 2004

(87) PCT Pub. No.: WO03/053074

PCT Pub. Date: Jun. 26, 2003

(65) Prior Publication Data

US 2005/0068937 A1     Mar. 31, 2005

(30) Foreign Application Priority Data

Dec. 17, 2001  (DE) ................................ 101 61 878

(51) Int. Cl.
  *H04L 12/66* (2006.01)
  *H04M 7/00* (2006.01)
  *H04M 11/00* (2006.01)
(52) U.S. Cl. .................. 370/352; 370/401; 370/467; 379/93.15; 379/220.01; 379/265.11
(58) Field of Classification Search ................ 370/357, 370/352, 401, 467; 709/201; 379/93.15, 379/220.01, 265.11
See application file for complete search history.

(56) References Cited

U.S. PATENT DOCUMENTS 5,961,586 A  * 10/1999 Pedersen .................. 709/201
7,227,927 B1 *  6/2007 Benedyk et al. ........... 379/9.05
7,257,110 B2 *  8/2007 Laxman et al. ............ 370/352

(Continued)

FOREIGN PATENT DOCUMENTS

WO        WO 01/59999 A1     8/2001

*Primary Examiner*—Alpus H Hsu
(74) *Attorney, Agent, or Firm*—Laurence A. Greenberg; Werner H. Stemer; Ralph E. Locher (57) ABSTRACT

Switching points in current voice telephony networks (PSTN/ISDN) deal with the control of links and useful channels. Next generation networks which are designed for voice and data work according to the principle of separation in the control of links and useful channels. Different network elements are used to control links and useful channels. Link control is carried out by soft switches which communicate by means of a suitable protocol with media gateways controlling the useful channel. A plurality of services are implemented in existing networks, said services continuing to be needed. This results in the following problem: the new development or porting of the software controlling said services required for the soft switches is extremely heavy and very complex. According to the invention, said problem is solved by means of a software model which replicates classic hardware used in next generation networks, said software model being configured in such a way that the control software of a network node used in a conventional telephone network controls the components of the next generation network replacing said classic hardware in conjunction with a soft switch by means of a control protocol.

11 Claims, 9 Drawing Sheets

U.S. PATENT DOCUMENTS 7,304,984 B2 * 12/2007 Butler et al. ................. 370/352
7,352,853 B1 * 4/2008 Shen et al. ............. 379/201.12
2002/0188713 A1 * 12/2002 Bloch et al. .................. 709/223
2003/0161296 A1 * 8/2003 Butler et al. ................. 370/352

* cited by examiner

METHOD FOR PROVIDING PSTN/ISDN SERVICES IN NEXT GENERATION NETWORKS

CROSS REFERENCE TO RELATED APPLICATIONS

This application is the US National Stage of International Application No. PCT/DE02/04619, filed Dec. 17, 2002 and claims the benefit thereof.

The International Application claims the benefits of German application No. 10161878.6 filed Dec. 17, 2001, both of the applications are incorporated by reference herein in their entirety.

FIELD OF INVENTION

This invention relates to a method for providing PSTN/ISDN Services in next generation networks.

BACKGROUND OF INVENTION

Local exchanges and transit exchanges in current voice telephony networks (PSTN/ISDN=Public Switched Telephone Network/Integrated Services Digital Network) which are based upon the principle of circuit switching (TDM=Time Division Multiplex) deal with the control of links and useful channels (e.g. two-party links, tripartite links, feeding of tones).

Next generation networks (e.g. ATM=Asynchronous Transfer Mode, IP=Internet Protocol) which are designed for voice and data work according to the principle of separation in the control of links and useful channels. Thus, in next generation networks (NGN), unlike in PSTN/ISDN, different network elements are used to control links and useful channels. Here, link control is carried out by soft switches which communicate by means of a suitable media gateway control protocol with the media gateways controlling the useful channel. The soft switches in the NGN communicate with one another via a suitable signaling protocol, e.g. BICC=Bearer Independent Call Control, in a similar way to the PSTN/ISDN switching points, where e.g. signaling system No. 7 (CCS7) is used.

Figure 1:
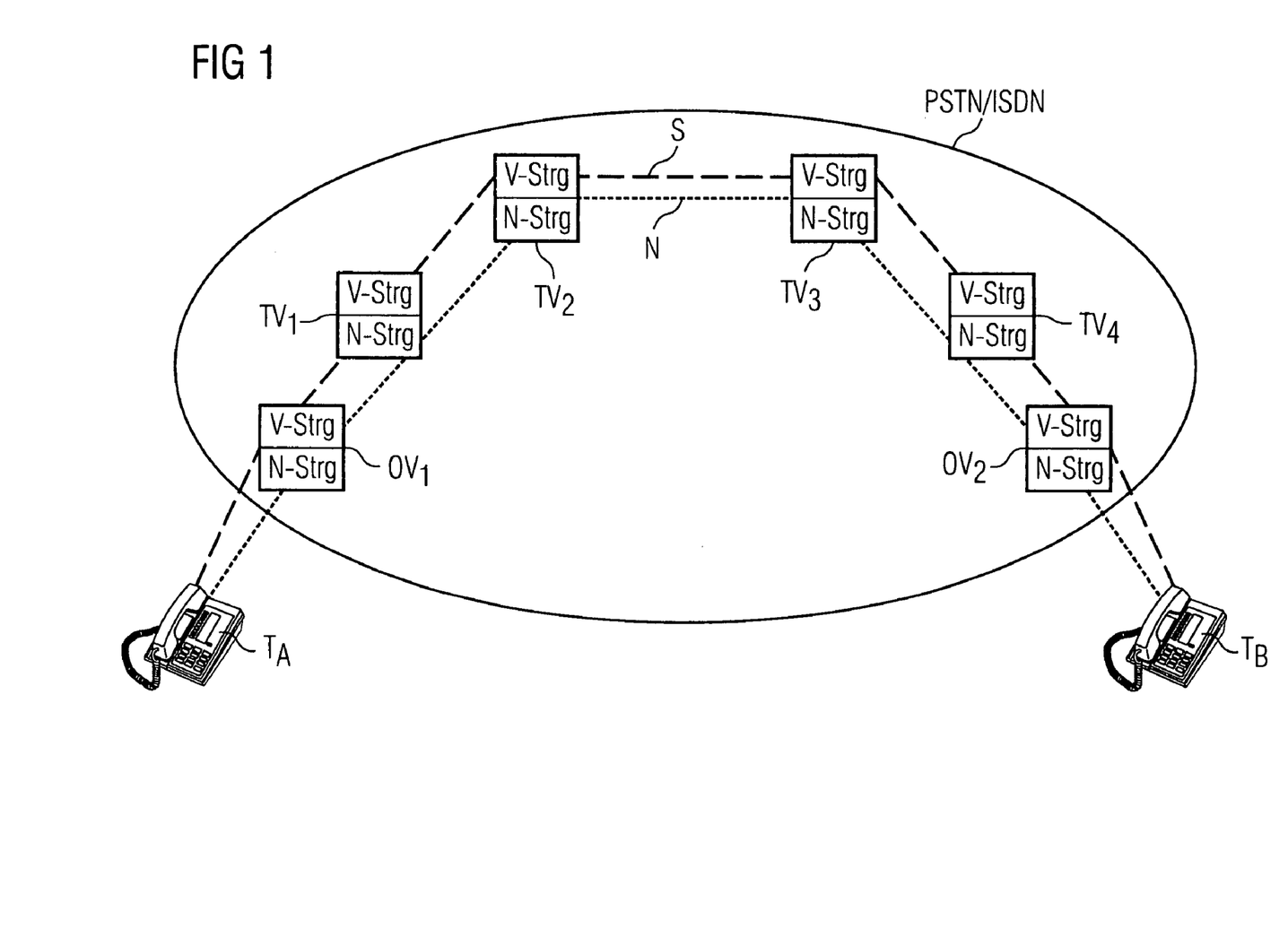
FIG. 1 shows schematically the basic structure of a PSTN.
Figure 2:
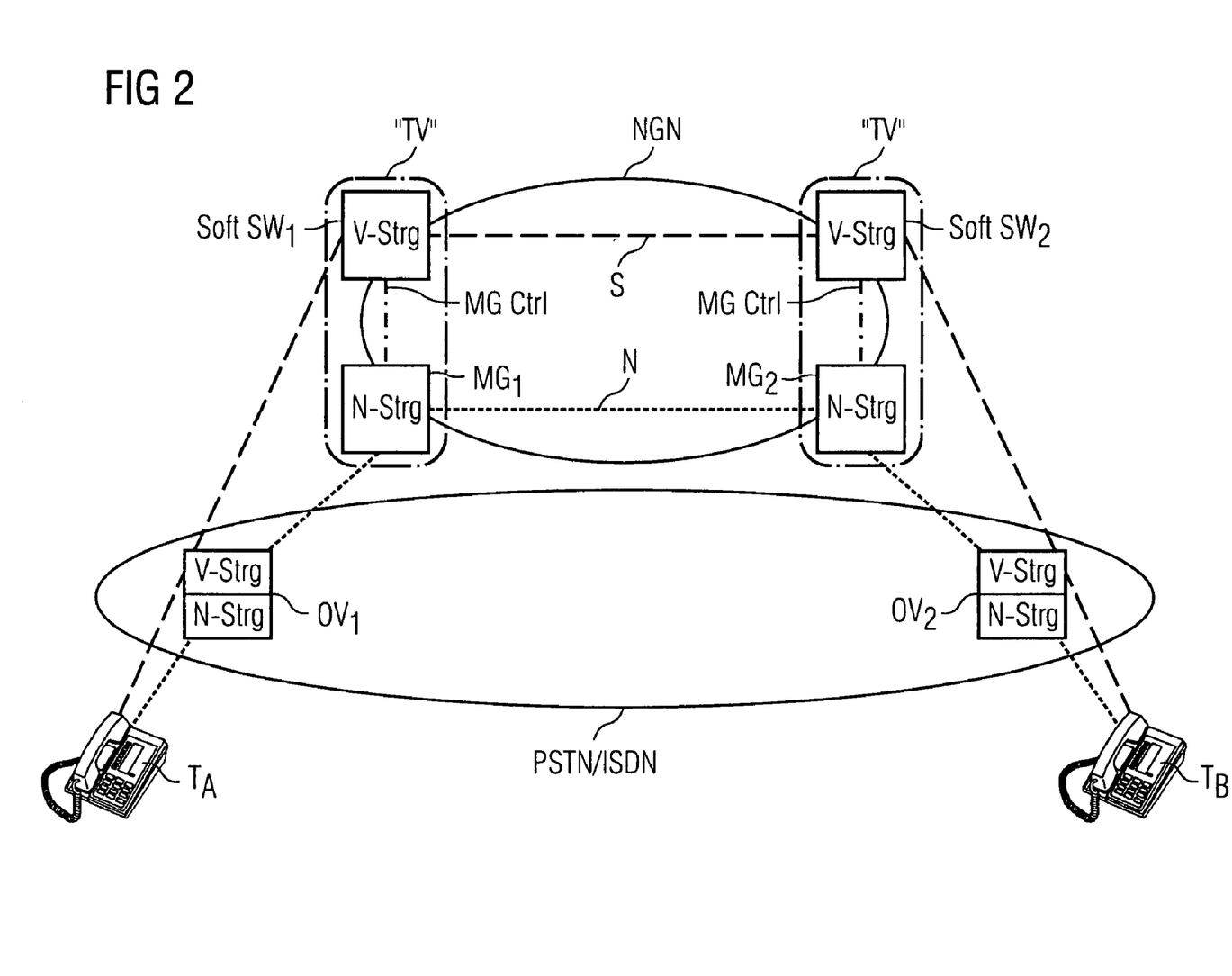
FIG. 2 shows schematically a possible example of an NGN architecture, here still including components of the PSTN.

FIG. 1 shows the principle of current PSTN/ISDN networks, while FIG. 2 represents the principle of voice communication in next generation networks NGN.

An example of the structure of a next generation network is known from the publication WO 01/59999. WO 01/59999 discloses a next generation communication network with service generation switches which control media gateways of the next generation network by means of a control protocol, the media gateways replacing hardware of a conventional public telephone network (PSTN/ISDN). WO 01/59999 also describes a method for controlling services in such a network.

A plurality of subscriber and network services are implemented in current PSTN/ISDN networks, said services continuing to be needed by end customers and network operators, irrespective of the technical implementation. Implementation of these services affects as a rule the control of links and useful channels.

The split of functions in NGNs, i.e. separation of the control of links VStrg and the control of useful channels NStrg prevents the use of control software of current switching points in NGNs. The soft switches SoftSW which deal with link control in the NGNs, should preferably be formed by standard computers and in this way replace the highly specialized switching processors.

The problem arises here that the new development or porting of the software controlling PSTN/ISDN services for standard computers is extremely costly and very complex. Furthermore, a soft switch has to be interoperable with classic transit exchanges, that is be capable of managing the relevant classic signaling protocols and procedures, because the current PSTN/ISDN network and the next generation networks will coexist for quite a long time.

This problem arises again as a consequence of the use of next generation networks for providing classic telephony services (replication of the PSTN/ISDN). Known proposed solution to date are:
New development of the control software on commercial platforms
Specific further development of classic switching points.

SUMMARY OF INVENTION

An object of the invention is therefore to indicate a method with which the control software of classic local and transit exchanges can be reused for link control in next generation networks with the minimum possible outlay, i.e. practically unaltered. The particular problem here is the inclusion of the new distribution of functions, i.e. the control of remote media gateways by the media gateway control protocol MGCP.

This object is achieved by the claims. Preferred embodiments can be taken from the dependent claims.

According to the invention, there is provided a method for controlling telephony services in next generation communication networks NGN, in accordance with which method a software model S/W-Mod replicates the classic hardware K, KU, TG/AG, D, relating to the useful channel (N), of a conventional telephone network PSTN/ISDN used in next generation networks NGN, said software model S/W-Mod being configured in such a way that the control software V-StrgS/W of a network node OV, TV used in a conventional telephone network controls the components KS, AS, MG of the next generation network NGN replacing said classic hardware K, KU, TG/AG, D, relating to the useful channel (N), in conjunction with a soft switch SoftSW by means of a control protocol MGCtrl.

It can advantageously be provided that the software model S/W-Mod of the control software replicates first interfaces I in the direction of control software V-StrgS/W corresponding to the interfaces $I_1$, $I_2$, $I_3$, $I_4$ of the replaced classic hardware K, KU, TG/AG, D.

Furthermore, the software model (S/W-Mod) can be configurable in such a way that addressing information can be derived that is necessary for communicating with the components (KS, AS, MG) of the next generation network (NGN) and for controlling the useful channels (N).

The addresses of useful channels N relating to the classic hardware can be converted into the addresses of useful channels relating to the components of the next generation network NGN by means of a table.

It can advantageously be provided that the software model S/W-Mod is configurable in such a way that different control protocols MGCtrl are used for controlling the components of the next generation network NGN without effects on the control software.

Specific useful-channel description data necessary for controlling the components of the next generation network (NGN) can be exchanged without effect on the control software (V-StrgS/W) within the soft switches and between further soft switches through the introduction of a signaling gateway agent (SG-A) by means of a second interface (U).

Classic signaling protocols can be fed to a protocol stack specifically for next generation networks by means of signaling gateway agents (SG-A) and the second interface (U) by means of the software model (S/W-Mod) and converted into a signaling protocol specifically for next generation networks.

According to the invention, there is further provided a network node (SoftSW) of a next generation communication network (NGN) which has means (S/W-Mod) for replicating replaced classic hardware (K, KU, TG/AG, D), relating to the useful channel (N), of a conventional public telephone network (PSTN/ISDN), said means being configured in such a way that the control software (V-StrgS/W) of a network node (OV, TV) used in a conventional telephone network controls the components (KS, AS, MG) of the next generation network NGN replacing said classic hardware (K, KU, TG/AG, D), relating to the useful channel (N), in conjunction with the network node (SoftSW) by means of a control protocol (MGCtrl).

The network node can additionally have means for replicating first interfaces (I) in the direction of control software (V-StrgS/W), the interfaces (I) corresponding to the interfaces ($I_1$, $I_2$, $I_3$, $I_4$) of the replaced classic hardware (K, KU, TG/AG, D).

For the network node there can also be provided means for determining addressing information of components (KS, AS, MG) of the next generation network NGN and for determining addressing information for controlling the useful channels (N), as well as one or more signaling gateway agents (SG-A) for exchanging without effect on the control software (V-StrgS/W) the useful-channel description data necessary for controlling the components of the next generation network within the network node and between further network nodes by means of a second interface (U).

In a particular embodiment, the signaling gateway agent (SG-A) can additionally have converting means for converting classic signaling protocols into a signaling protocol specifically for next generation networks.

The invention exhibits the following advantages:
- The control software of classic switching points is made usable for soft switches by means of software modeling of the switching-point-specific hardware.
- All known PSTN/ISDN features can be provided in next generation networks NGN without it being necessary to recreate corresponding control software that has been adapted to the new platforms.
- The backend systems originally introduced for PSTN/ISDN (OA&M=operation, administration & maintenance, billing, traffic measurement) can continue to be used in the NGN.
- The control software which was originally switching-point-specific will be portable to any platforms.
- The control software does not have to be adapted if media gateways, the network technology or the media gateway control protocols change.

BRIEF DESCRIPTION OF THE DRAWINGS

An embodiment of the invention is explained in detail below in connection with 7 Figures, in which.

DETAILED DESCRIPTION OF INVENTION

As previously mentioned, FIG. 1 shows a representation of the principle of PSTN/ISDN voice telephony networks (hereinafter PSTN) in accordance with the state of the art. By way of example, the PSTN consists of local exchanges $OV_1$, $OV_2$ and transit exchanges $TV_{1..4}$. The local exchanges here generally serve the connection of subscribers or private branch networks.

In FIG. 1, a first subscriber terminal $T_a$ is connected to the first local exchange $OV_1$ and a second subscriber terminal $T_b$ is connected to the second local exchange $OV_2$. The subscriber terminals in this case can, for example, be analog or digital telephones. FIG. 1 shows ISDN telephones in the case of which signaling information and useful information is already transmitted on separate channels to the local exchange. More precisely, the D channel serves the transmission of signaling information and usually has a transmission rate of 16 kbit/s. There are as a rule two B channels, each with a bandwidth of 64 kbit/s, available for voice transmission.

The type of terminal is, however, irrelevant to the operating principle of the PSTN which, starting at latest from the local exchange OV, transmits useful information and signaling information over separate channels: useful channels N and signaling channels S. Consequently, all switching points have elements for controlling useful channels N-Strg and elements for controlling links V-Strg, the useful-channel controls N-Strg of the switching points OV, TV providing control of the useful channels N and the link controls V-Strg of the switching points OV, TV providing control of the signaling channels S.

As previously mentioned, the network topology is shown in greatly simplified form merely by way of example. Actual PSTN topologies also provide e.g. signaling transfer points STP which do not have useful-channel control N-Strg. A variant of the common channel signaling system No. 7 CCS7 is generally used for signaling. Furthermore, the representation in FIG. 1 is also simplified insofar as the first local exchange $OV_1$ is connected to a first transit exchange $TV_1$, this first transit exchange connected in turn to a second transit exchange $TV_2$, this second transit exchange connected in turn to a third transit exchange $TV_3$, which in turn is connected to a fourth transit exchange $TV_4$, the transit exchange $TV_4$ finally being connected to the second local exchange $OV_2$. In real PSTNs, direct connections, for example between the first and the fourth transit exchanges, are provided in many cases in order to reduce the failure frequency.

FIG. 2 shows an example of a configuration of a next generation network (hereinafter NGN). In the NGN, link control V-Strg and useful-channel control N-Strg are separated, i.e. implemented in separated components. By way of example, two transit exchanges TV have been shown as replaced by components of the NGN. At the same time, the signaling channel S is in each case connected to the link-controlling component, here a soft switch SW, whereas the useful channel N is connected to the useful-channel-controlling component, here a media gateway MG. In this case, a soft switch is connected by means of a control link MGCtrl to the assigned components, i.e. e.g. one or more media gateways.

In the case shown in FIG. 2, a PSTN/NGN interworking situation has been represented in which the subscriber terminals TA, TB are connected as in FIG. 1 to PSTN local exchanges $OV_1$, $OV_2$. The transit network in FIG. 2 is, in contrast to FIG. 1, formed by an NGN which by way of example consists of two soft switches $SoftSW_1$, $SoftSW_2$ and two media gateways $MG_1$, $MG_2$. Other topologies cover the case in which one of the subscriber terminals is already directly connected to the NGN or the case in which both subscriber terminals are already directly connected to the NGN (not shown).

The switching points $OV_1$, $OV_2$, $TV_{1..4}$ of the PSTN consist of a set of software V-StrgS/W for link control V-Strg and a set of hardware for useful-channel control N-Strg. The hardware for controlling useful channels N-Strg has to handle at least the following tasks:

Through-switching of calls between input and output port
Conference connection of multiple input and output ports
Feeding of tones and/or announcements
Detection of tones and/or voice.

Figure 3:
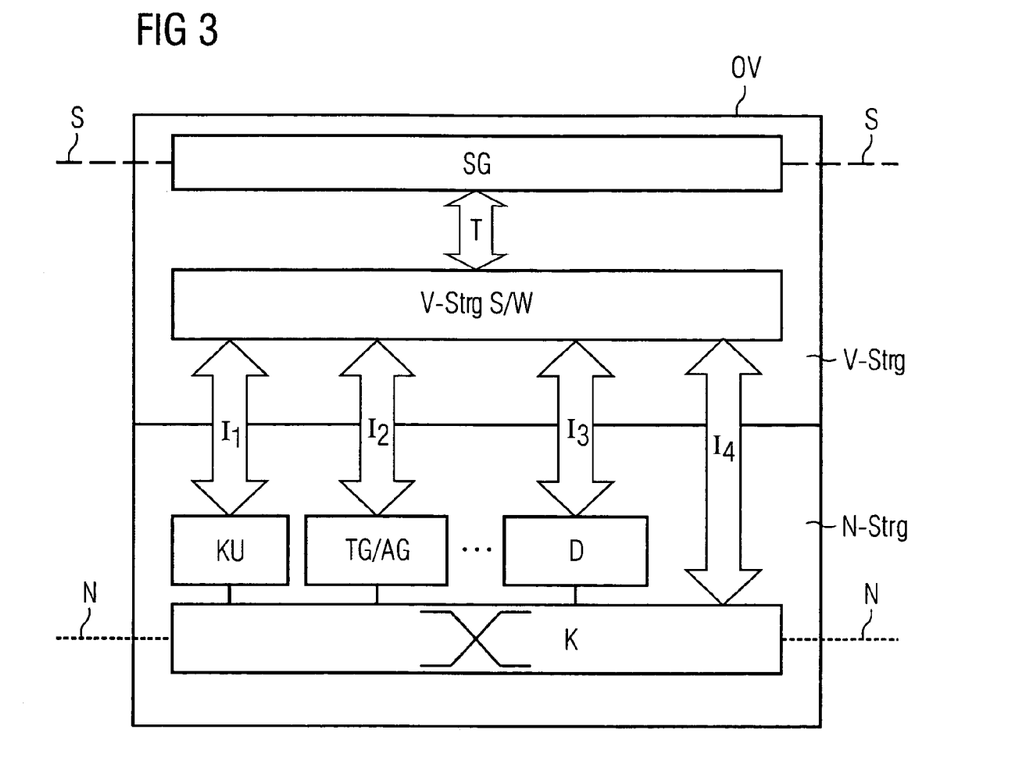
FIG. 3 shows schematically the components of a local exchange of the PSTN.

A switching point OV of the PSTN is shown schematically in FIG. 3. The specified tasks are assigned to different hardware modules as follows:

Through-connection of calls: switching network K
Conference connection: conference unit KU in connection with switching network K
Feeding of tones/announcements: tone generator TG and announcement generator AG
Detection of tones/voice: DTMF and voice detector D.

Here a switching processor (not shown) on which the software for controlling links V-StrgS/W runs has multiple interfaces with the specified components:

first interface $I_1$: conference unit KU
second interface $I_2$: tone generator TG and announcement generator AG
third interface $I_3$: DTMF and voice detector D
fourth interface $I_4$: switching network K.

The interfaces $I_{1..4}$ represent the connection between useful-channel control N-Strg and link control V-Strg. The useful channels N are connected directly or by means of defined modules (not shown) to the switching network K and the signaling channels to a signaling gateway SG which is connected via a fifth interface T to the switching processor and thus communicates with the link-control software V-StrgS/W.

In next generation networks, the specified tasks are dealt with by the media gateways so that the functionality of the PSTN/ISDN is replicated. By analogy with the PSTN/ISDN network, the control of features (link and useful-channel control) also takes place locally in the NGN, i.e. the tasks of a switching point in the PSTN/ISDN are handled by a soft switch SoftSW and components MG, AS, KS controlled by it by means of a media gateway control protocol MGCtrl.

Figure 6:
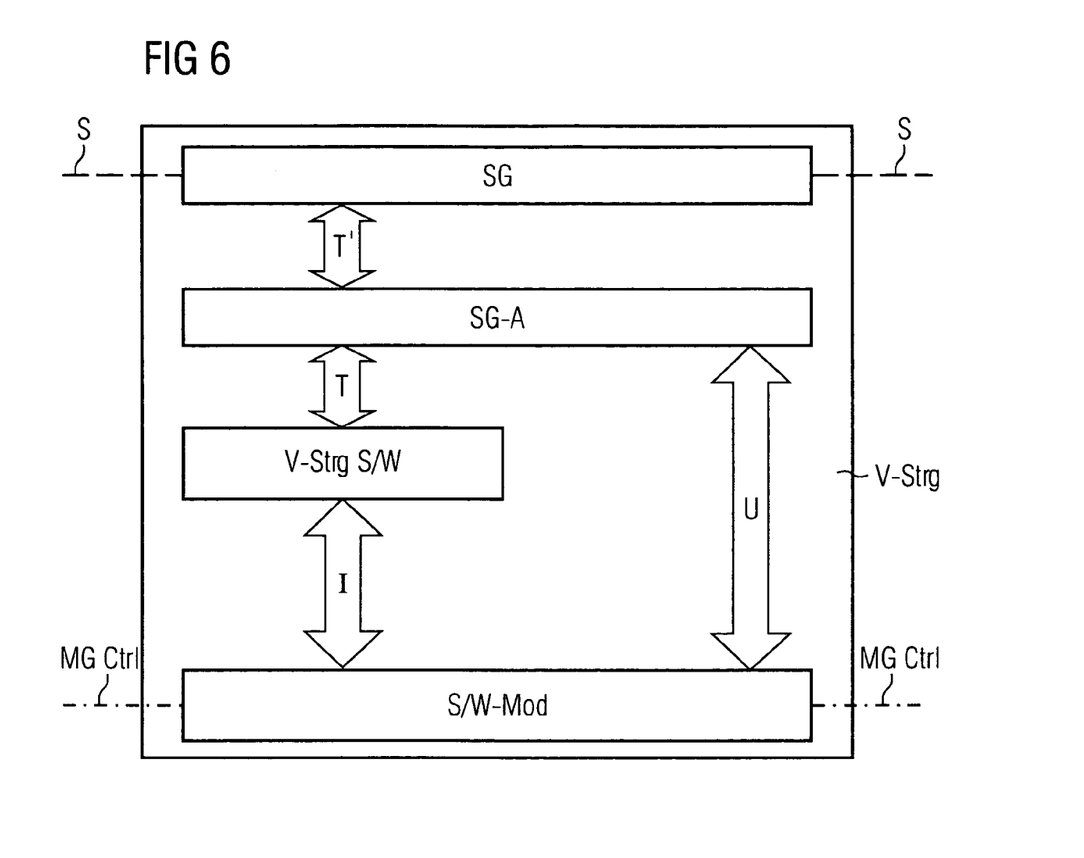
FIG. 6 shows the soft switch from FIG. 5 with further details.

This is shown in FIG. 6. The control of links V-Strg is dealt with in turn by a signaling gateway SG which communicates with the link-control software V-StrgS/W and together with this software forms the soft switch SoftSW and is connected to the signaling channels S. The control of useful channels N-Strg is formed in FIG. 6 of separate components which are controlled by the soft switch by means of a media gateway control MGCtrl and are connected to the useful channels N. These components are, in detail:

media gateway MG, consisting of the functional elements DTMF detector D, tone generator TG and transcoder TC
announcement server AS, consisting of the functional element announcement generator AG conference server KS, consisting of the functional element conference unit KU.

Figure 4:
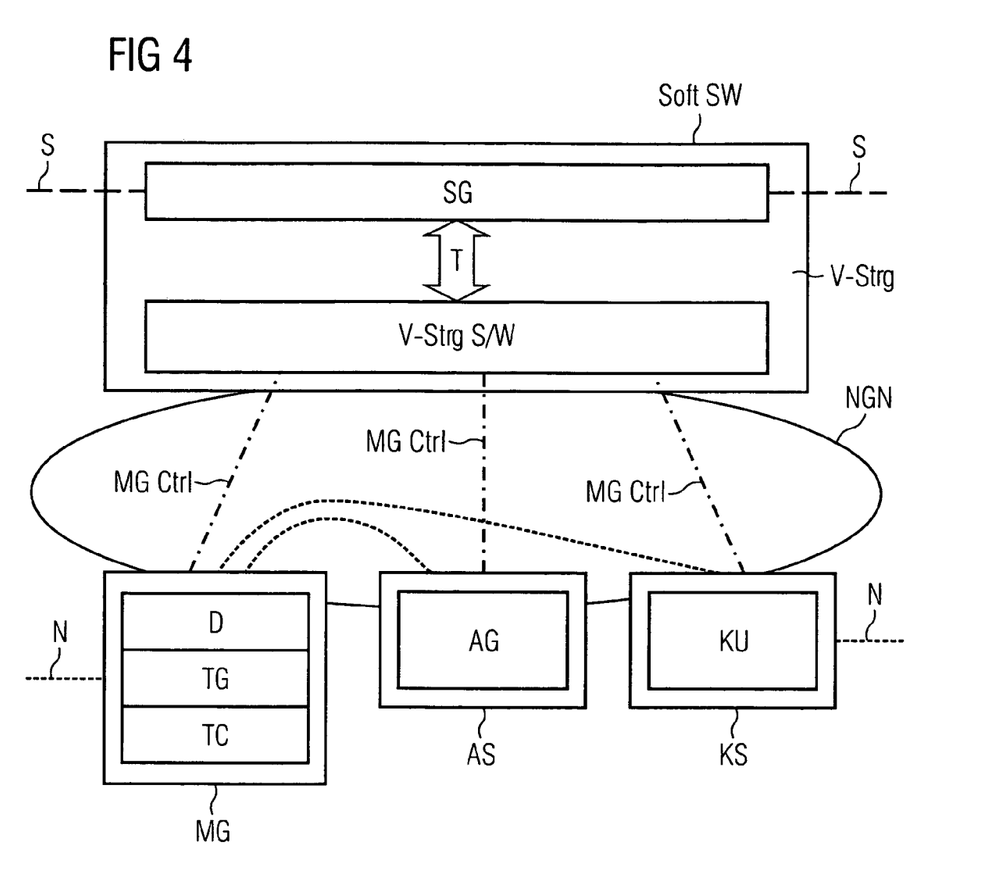
FIG. 4 shows schematically a functional group of an NGN which handles the tasks of the local exchange from FIG. 3.

Via the NGN, as illustrated in FIG. 4, these components are in communication with the soft switch and in direct communication with one another, as shown by dotted lines. The media gateway control protocol MGCP, for example, can be used as a control protocol on the media gateway control links.

Figure 5:
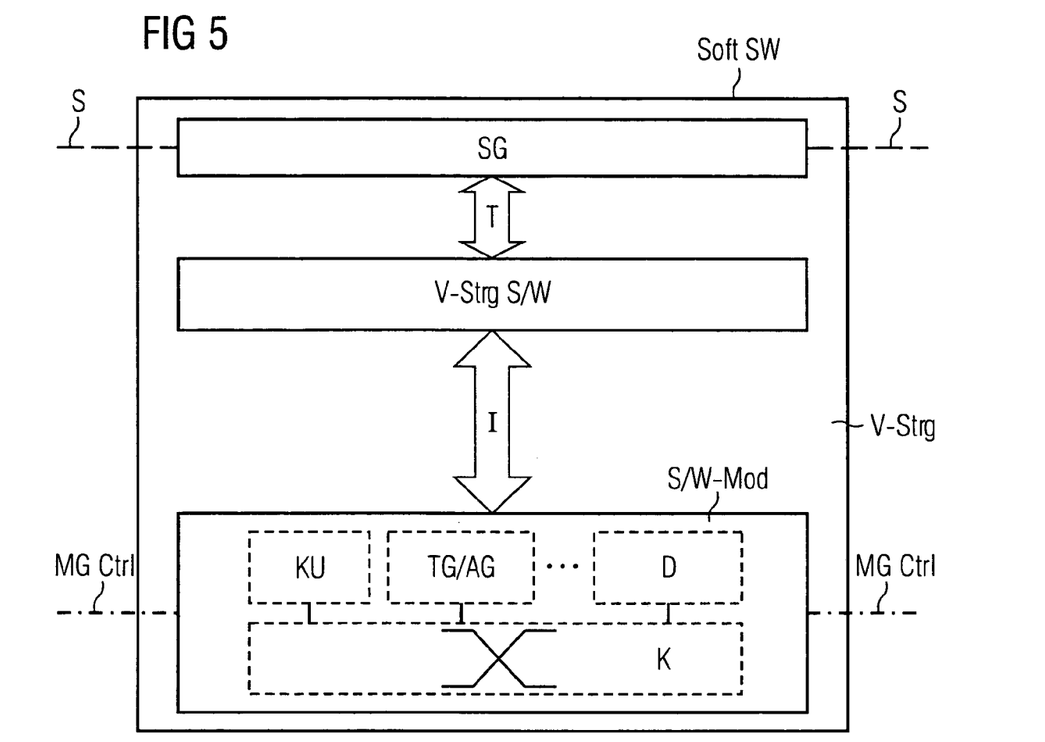
FIG. 5 shows schematically a soft switch of the NGN which has a software model according to the invention of the useful-channel hardware of the local exchange from FIG. 3.

FIGS. 5 and 6 show a soft switch SoftSW which is upgraded according to the invention such that the control software V-StrgS/W and signaling gateway functionality SG of classic switching points of the PSTN can be used for the control of links V-Strg in NGNs.

To this end, a set of software or a software model S/W-Mod of the original hardware of the PSTN switching point is introduced which models the behavior of the useful-channel-related hardware no longer needed. This set of software S/W-Mod has an interface I with the control software V-StrgS/W which is similar or identical to the replaced interfaces $I_{1..4}$ to the switching-point-specific hardware no longer needed: conference unit KU, tone/announcement generator TG/AG, DTMF/voice detector D, switching network K in FIG. 3. Here, the software model S/W-Mod generated converts the hardware-specific commands and addresses of the link-control software V-StrgS/W into suitable instructions of the interface MGCtrl, in that the set of software S/W-Mod can be configured in such a way that the addressing information, for example a URL, necessary for communicating with the media gateways MG or the corresponding useful-channel control can be derived from the hardware modeling.

The virtual switching-point-specific useful-channel addresses are converted via a table into the useful-channel addresses of the media gateway MG and exchanged via the media gateway control protocol, e.g. hardware address/equipment number EQN<->URL, which identifies the useful channel in the media gateway.

Through appropriate structuring of the set of software, it is easily possible to achieve configurability of the set of software with regard to the control protocol MGCtrl used for media gateways MG so that different media gateway control protocols and thus different media gateways e.g. manufacturer-specific, application-specific ISDN/trunking or technology-specific, e.g. ATM, IP can be used without effects on the control software.

In FIG. 6, a signaling gateway agent SG-A is introduced, via which the specific useful-channel description data necessary for controlling the various media gateways MG and servers AS, KS can be exchanged within a soft switch SoftSW and between multiple soft switches by means of an interface U without effects on the control software V-StrgS/W. Classic signaling control protocols can be managed by means of the signaling gateway agent SG-A and the interface U via the software model S/W-Mod and fed by the software model as required to an NGN-specific protocol stack and converted into an NGN-specific signaling protocol. This enables during a transition phase classic components of the PSTN and components of the NGN to deal with switching tasks in one network.

Figure 7A:
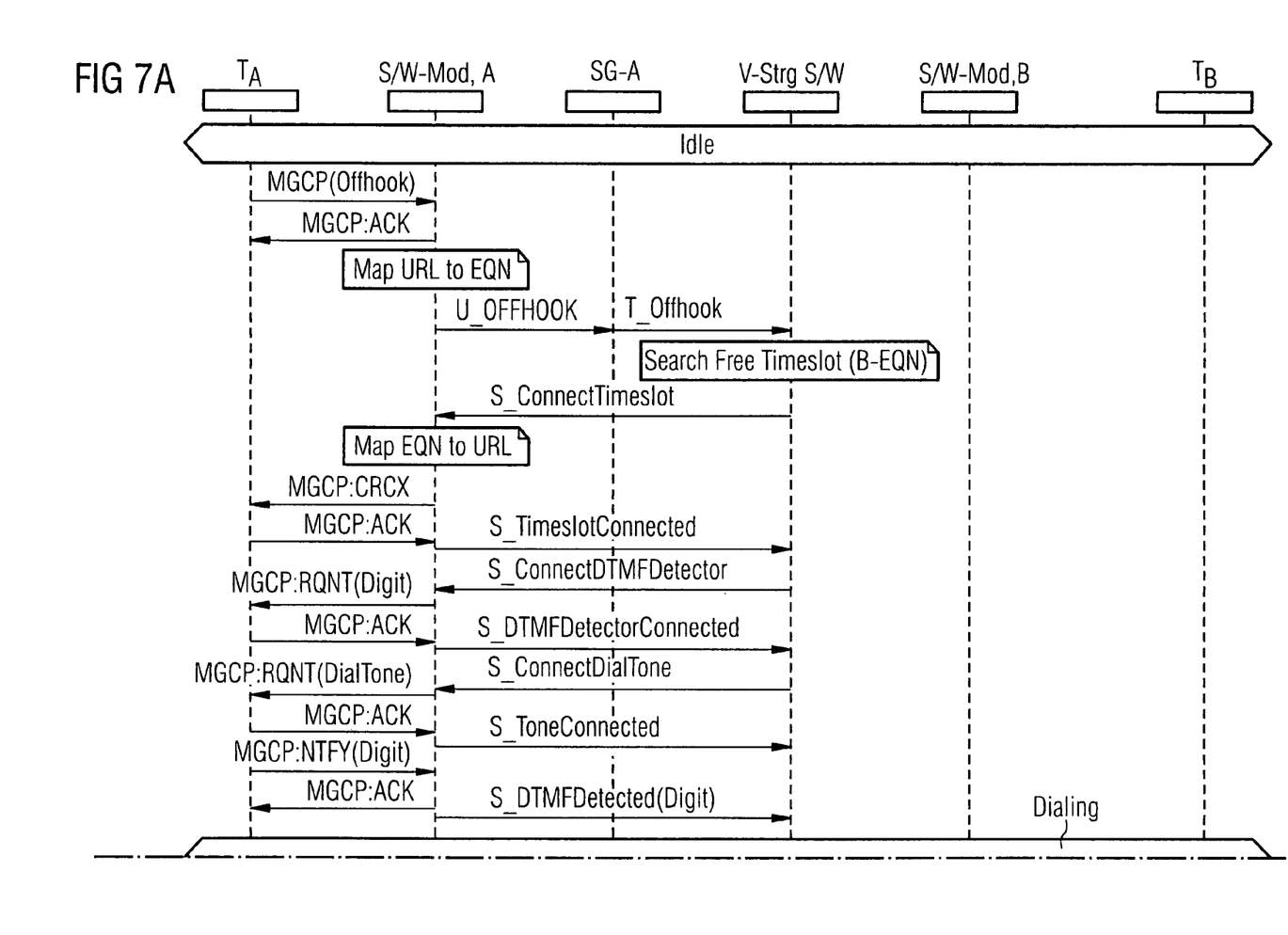
FIG. 7 shows a flow chart of a sample call establishment procedure using the software model according to the invention of the useful-channel hardware.
Figure 7B:
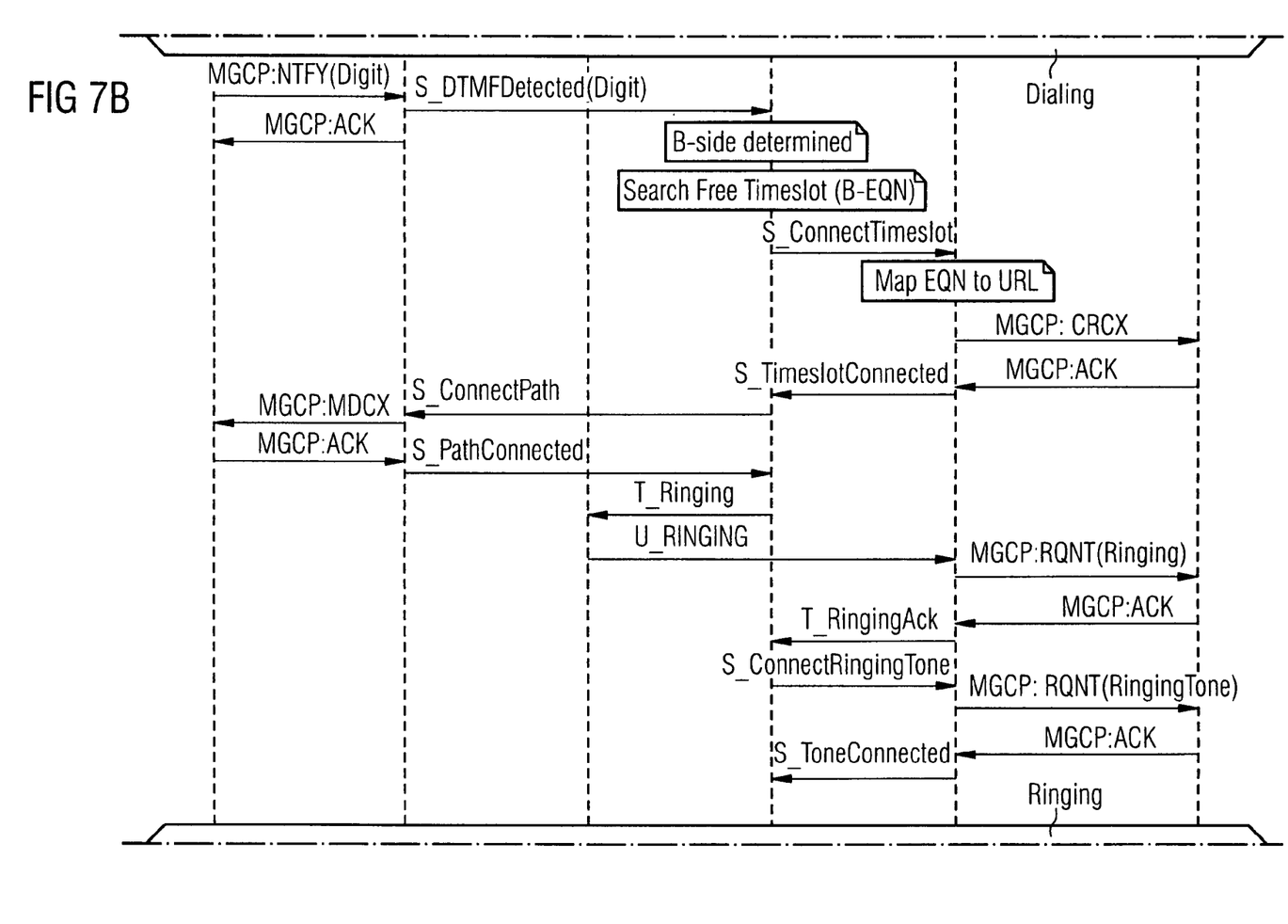
Figure 7C:
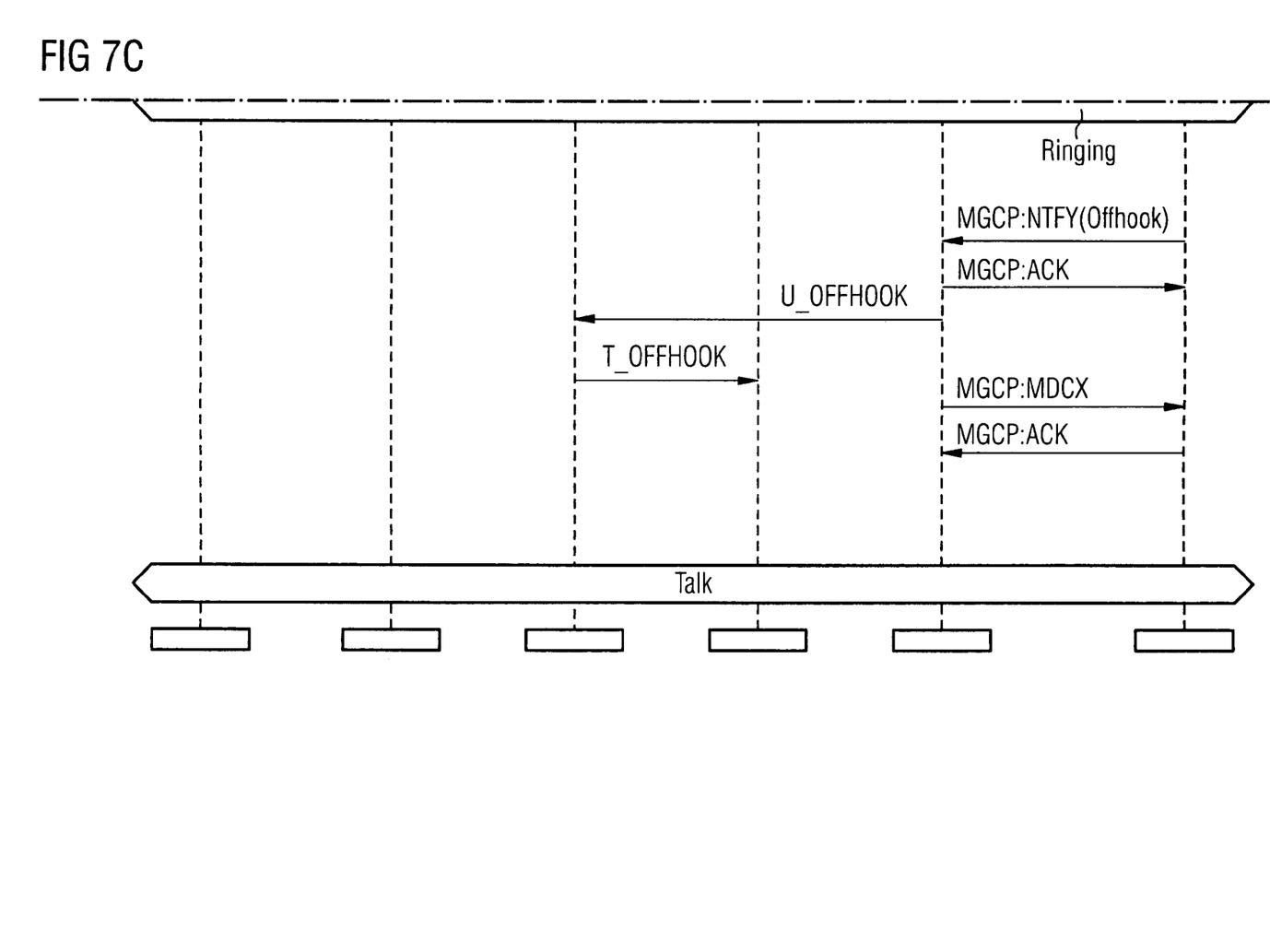

FIGS. 7A-7C show an example of a message sequence for establishing a call using the software model S/W-Mod. It is assumed for this message sequence that the subscriber terminals $T_A$, $T_B$ are, in contrast to the representations shown in FIGS. 1 and 2, NGN terminals or that they are media gateways.

The invention claimed is:

1. A method for controlling telephony services in a next generation communication network, comprising:
   providing a first soft switch in the next generation communication network;
   controlling components of the next generation network by a control protocol, wherein the components replace hardware, relating to a useful channel of a public telephone network based on circuit switching;
   replicating in the next generation network the replaced hardware, relating to the useful channel of the public telephone network based on circuit switching, with the aid of a software model; and
   controlling the components of the next generation network by the first soft switch, wherein control software of a network node of a telephone network based on circuit switching is reused.

2. A method according to claim 1, wherein the software model of the control software replicates first interfaces in the direction of control software which correspond to interfaces of the replaced hardware.

3. A method according to claim 2, wherein the software model is configured in such a way that addressing information necessary for communicating with the components of the next generation network and for controlling the useful channel can be derived.

4. A method according to claim 2, wherein addresses of the useful channel relating to the hardware are converted via a table into addresses of useful channels relating to the components of the next generation network.

5. A method according to claim 2, wherein the software model is configured in such a way that different control protocols are used for controlling the components of the next generation network without effects on the control software.

6. A method according to claim 2, wherein specific useful-channel description data necessary for controlling the components of the next generation network are exchanged within the first soft switch and a second soft switches through the introduction of a signaling gateway agent by a second interface without effects on the control software.

7. A method according to claim 1, wherein the software model is configured in such a way that addressing information necessary for communicating with the components of the next generation network and for controlling the useful channel is derived.

8. A method according to claim 1, wherein addresses of the useful channels relating to the hardware are converted via a table into addresses of useful channel relating to the components of the next generation network.

9. A method according to claim 1, wherein the software model is configured in such a way that different control protocols are used for controlling the components of the next generation network without effects on the control software.

10. A method according to claim 1, wherein specific useful-channel description data necessary for controlling the components of the next generation network are exchanged within the first soft switch and a second soft switches through the introduction of a signaling gateway agent by a second interface without effects on the control software.

11. A method according to claim 10, wherein classic signaling protocols are fed by signaling gateway agents and the second interface by the software model to a protocol stack specifically for next generation networks and converted into a signaling protocol specifically for next generation networks.

* * * * *